US008346910B2

(12) United States Patent
Barrett

(10) Patent No.: US 8,346,910 B2
(45) Date of Patent: Jan. 1, 2013

(54) METHOD AND APPARATUS FOR MANAGING AN INTERACTIVE NETWORK SESSION

(75) Inventor: Michael Barrett, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 911 days.

(21) Appl. No.: 10/999,570

(22) Filed: Nov. 30, 2004

(65) Prior Publication Data
US 2007/0180122 A1 Aug. 2, 2007

(51) Int. Cl.
G06F 15/173 (2006.01)
G06F 15/16 (2006.01)
G06F 7/04 (2006.01)
G06F 17/30 (2006.01)

(52) U.S. Cl. ........ 709/224; 709/223; 709/225; 709/227; 709/228; 709/229; 726/2; 726/3; 726/4; 726/26; 726/27; 726/28; 705/64; 705/70; 705/72

(58) Field of Classification Search .................. 709/223, 709/224, 227; 726/17, 2–4, 26–29; 705/35; 707/9; 710/5
See application file for complete search history.

(56) References Cited

U.S. PATENT DOCUMENTS

| 4,864,557 | A | * | 9/1989 | Morton et al. | 370/503 |
|---|---|---|---|---|---|
| 5,602,933 | A | * | 2/1997 | Blackwell et al. | 382/116 |
| 5,696,952 | A | * | 12/1997 | Pontarelli | 713/600 |
| 5,768,602 | A | * | 6/1998 | Dhuey | 713/322 |
| 5,832,283 | A | * | 11/1998 | Chou et al. | 713/300 |
| 6,223,289 | B1 | * | 4/2001 | Wall et al. | 726/16 |
| 6,256,019 | B1 | * | 7/2001 | Allport | 345/169 |
| 6,347,339 | B1 | * | 2/2002 | Morris et al. | 709/237 |
| 6,349,335 | B1 | * | 2/2002 | Jenney | 709/224 |
| 6,374,145 | B1 | * | 4/2002 | Lignoul | 700/17 |
| 6,463,474 | B1 | * | 10/2002 | Fuh et al. | 709/225 |
| 6,484,174 | B1 | * | 11/2002 | Wall et al. | 707/9 |
| 6,490,624 | B1 | * | 12/2002 | Sampson et al. | 709/227 |
| 6,560,322 | B2 | * | 5/2003 | Yamaguchi et al. | 379/102.02 |
| 6,560,711 | B1 | * | 5/2003 | Given et al. | 726/34 |
| 6,609,154 | B1 | * | 8/2003 | Fuh et al. | 709/225 |
| 6,615,244 | B1 | * | 9/2003 | Singhal | 709/213 |
| 6,631,405 | B1 | * | 10/2003 | Kobata | 709/219 |
| 7,024,556 | B1 | * | 4/2006 | Hadjinikitas et al. | 713/168 |
| 7,100,203 | B1 | * | 8/2006 | Tosey | 726/17 |
| 7,337,210 | B2 | * | 2/2008 | Barsness | 709/204 |
| 7,660,756 | B2 | * | 2/2010 | Nakamura et al. | 705/35 |
| 2002/0156897 | A1 | * | 10/2002 | Chintalapati et al. | 709/227 |
| 2002/0165954 | A1 | * | 11/2002 | Eshghi et al. | 709/224 |
| 2002/0174335 | A1 | * | 11/2002 | Zhang et al. | 713/168 |
| 2003/0195963 | A1 | * | 10/2003 | Song et al. | 709/227 |
| 2004/0059930 | A1 | * | 3/2004 | DiFalco et al. | 713/194 |
| 2006/0026689 | A1 | * | 2/2006 | Barker et al. | 726/26 |

* cited by examiner

Primary Examiner — Tae Kim
(74) Attorney, Agent, or Firm — Snell & Wilmer L.L.P.

(57) ABSTRACT

Methods for controlling online session inactivity timeouts between a user terminal and a server involves the server polling the user's local terminal to determine whether the user presence at the terminal can be confirmed if there is a period of inactivity within the session. If so, or if the server can otherwise confirm that the terminal is secured from use by other users, then the user session is maintained. Otherwise, the user session is allowed to timeout due to inactivity. The server may issue an alert to the user whenever a timeout is imminent, and may restore any information entered by the user prior to the timeout, if the user later returns and validates his identification.

13 Claims, 3 Drawing Sheets

METHOD AND APPARATUS FOR MANAGING AN INTERACTIVE NETWORK SESSION

TECHNICAL FIELD

This disclosure generally relates to multi-computer data transferring, and in particular it relates to computer-to-computer session parameter settings.

BACKGROUND OF THE DISCLOSURE

Proper management of sessions between users and a server over a computer network is important, for example, in regulating network availability of server resources and data. Those users who have entered into a session with a server are generally timed out (e.g., the user session is terminated) after a period of inactivity so that such server resources and data may be made available to other users on the network.

Most session timeout policies, as currently practiced in many business network environments and over very large public networks such as the World Wide Web, are actually very old in their thinking. They generally dictate that a user session should automatically timeout after anywhere from ten to twenty minutes of inactivity, on the general assumption that the user has left their terminal and/or intends to abandon the session. In those instances where the session involves the transfer of confidential or sensitive information (e.g., financial data of the user), there is a further concern that such information may be exposed to other parties on the user's terminal in the user's absence. Consequently, this provides a further motivation to simply timeout the user session, thereby eliminating the display or usefulness of the information entered by the user.

These prolific timeout standards may be described as embodying a "3270-centric" view of the networking world, in reference to the IBM 3270 terminal communications originally developed in the dawn of network computing to manage remote terminal communications with a mainframe computer. Since that time, there have been vast improvements in the speed and security of network communications and the functionality of remote terminals. However, the original general session timeout standards remain. As a consequence, in present network management applications, there is no recognition that a user's terminal or computing device can provide relevant data to a server, such that intelligent decisions can be made as to when to automatically timeout a session. There's also no notion that the security features found on most computing devices can be leveraged to contribute to such automated decision-making.

Outdated session timeout policies can cause problems for employees, customers, and other types of network users, who use some network applications and then may switch to a different application for a period of time, or temporarily have to leave or discontinue use of their terminal. When a user returns to the network session, she very often finds that the session has timed out, thus deleting any data previously entered, and that it is now necessary to log on to the server again and re-enter such data. This common result can be a major nuisance for users, and negatively affects both their productivity, as well as their perceptions of the usability of any systems that behave this manner. In a public environment, such as the Internet, an online merchant may frequently and needlessly frustrate its customers by employing such outmoded timeout standards on its web site, and perhaps even inadvertently dissuade many potential customers from using the web site.

Accordingly, there is a need for a method and apparatus for managing network sessions that addresses certain problems of existing technologies.

SUMMARY OF THE DISCLOSURE

To meet the above-identified needs, various aspects of a method and apparatus for managing interactive networks sessions is presented herein aimed at a user wishing to transmit information to a server over a computer network. The server may maintain a network session with a user and begin timing the session in any of a variety of manners. If the session time reaches a predetermined threshold before the form is completed by the user, or if there is otherwise a sufficient period of inactivity in the session, the server first determines whether the user is present at the computing device, and whether the computing device is secured from use by other users (e.g., by a system password protection scheme). The server may terminate the session thereafter, but only when neither of those conditions is confirmed.

The server may confirm a user's presence in any of a variety of manners. In some embodiments, the server transmits an alert to the user that may require a user response in advance of the timeout threshold. A timely acknowledgement or other response to the alert by the user may then serve to confirm the user's presence at the terminal.

In various embodiments, the server may confirm that the user is present at their computing device by polling the operating system thereof to determine whether any of the following types of events has recently occurred at the terminal: an update to an input device queue of the operating system, an opening or closing of an application registered in a registry of the operating system, an insertion or removal of media in the computing device, an activation or deactivation of any component in communication with the computing device, and an expansion or collapse of any window of the operating system. Any one or more of these events may serve to confirm that the user is at the terminal, but interacting with it outside the network session. In such instances, the network session timer may be reset, and the session may persist as long as such activity at the user terminal continues to be periodically or continuously detected.

In additional embodiments, the server may be configured to poll specific types of components in communication with the user's terminal, such as biometric or proximity sensors of various types, to see if they have recently registered or verified the user's presence at the terminal.

In still further embodiments, as the threshold timeout period is reached, the server may determine whether the computing device is secured from use by other users before the session is terminated. This may be accomplished, in one example, by determining whether a password protection scheme has been activated by the operating system on the user's terminal, whereby the password protection scheme requires an entry of a valid password to continue using the computing device. The network session may be maintained and continued if the user enters a valid password upon returning to her computing device.

BRIEF DESCRIPTION OF THE DRAWINGS

Further aspects of the present disclosure will be more readily appreciated upon review of the detailed description of its various embodiments, described below, when taken in conjunction with the accompanying drawings, of which.

DETAILED DESCRIPTION OF THE SPECIFIC EMBODIMENTS

Figure 1:
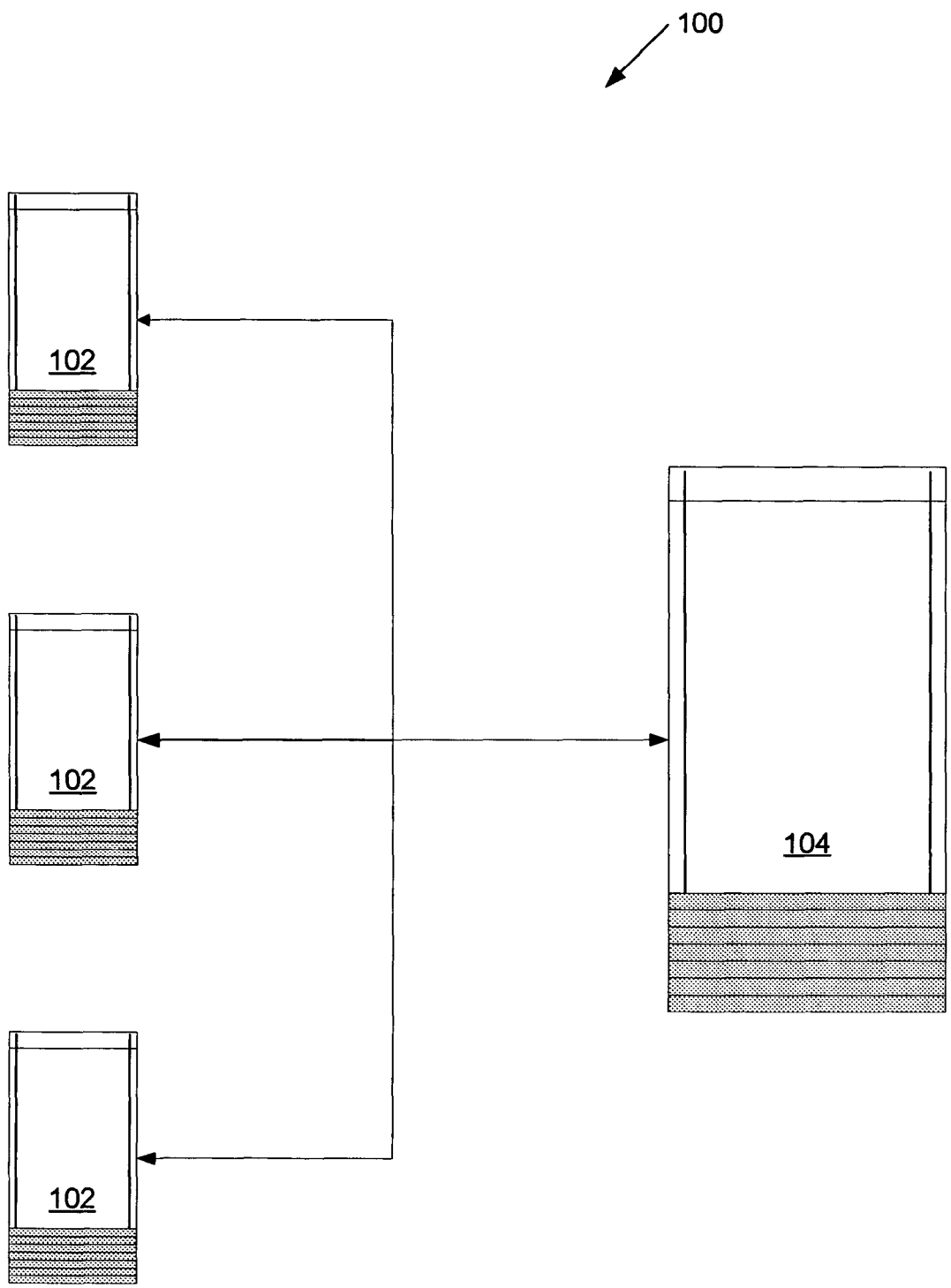
FIG. 1 is a block diagram of an exemplary computer network over which the processes of the present disclosure may be performed.
Figure 2:
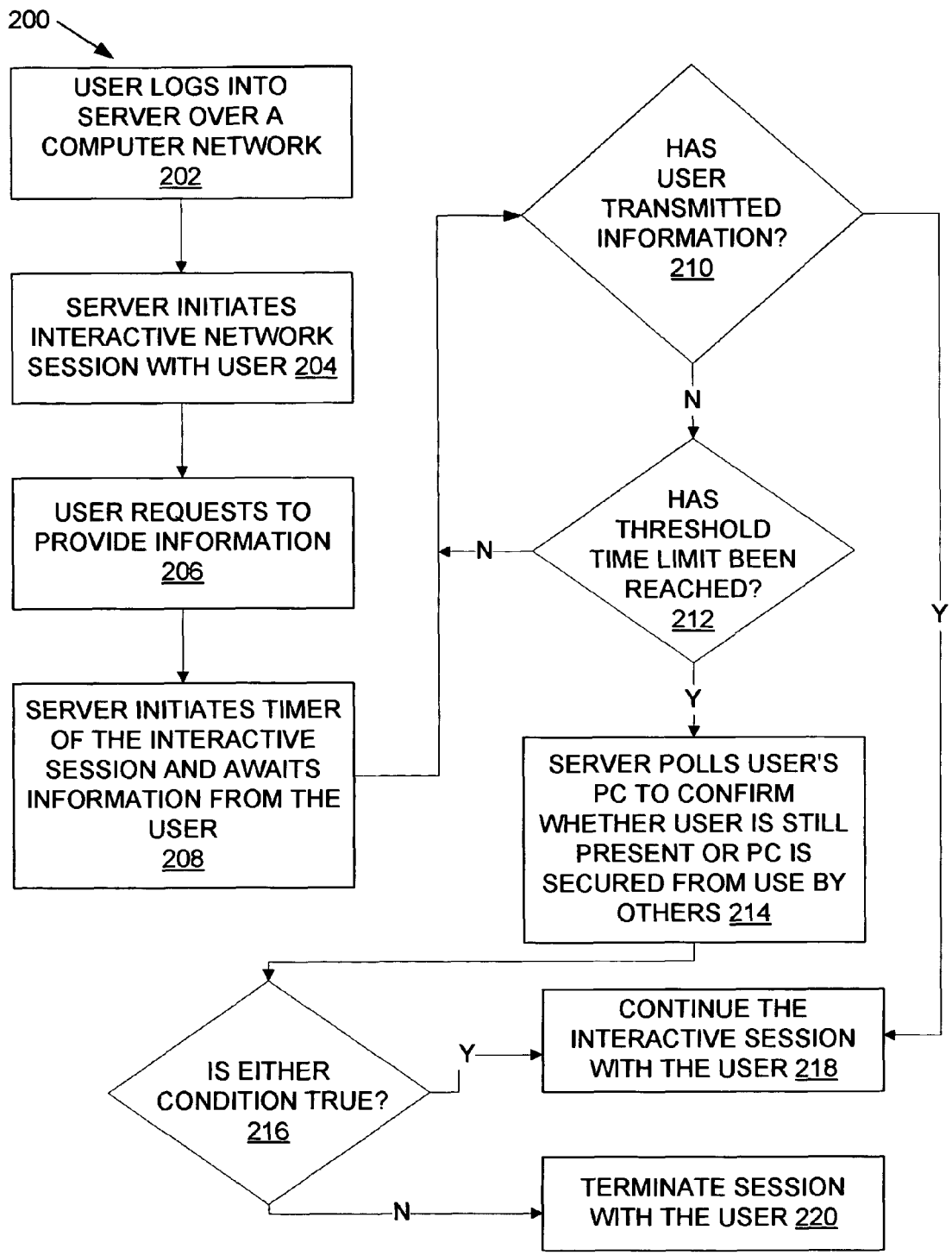
FIG. 2 is a flowchart depicting an exemplary online session management process performed over the network of FIG. 1.

Referring now to FIGS. 1-2, wherein similar components of the present disclosure are referenced in like manner, various embodiments of a method and apparatus for managing user sessions over a computer network will now be disclosed. In accordance with various general aspects of the disclosure, a server may obtain and utilize relevant data from a user's local computing device and its operating system to determine whether a network session with the user should be timed out or terminated after a period of inactivity.

To accomplish this, the server may download programming code (such as an ACTIVE-X control, JAVA code or a JAVASCRIPT applet) to the user's computing device at the start of an interactive session. The programming code polls the user's operating system to determine if certain events have occurred, which indicate that the user is still present at the terminal. The programming code may also confirm that a password protection scheme is in place on the user's terminal, or that the terminal is otherwise presently secured, such that other users are prevented from accessing the terminal. If either or both of these conditions are true, and current network conditions permit, the server will continue the user session, rather than automatically terminating it. The server may periodically re-check the presence of the user and/or accessibility of the user's computing device to ensure that either condition remains valid, and will eventually terminate the user session only when neither condition can be confirmed.

Turning now to FIG. 1, there is depicted an exemplary network 100 over which the processes of the present disclosure may be implemented. The network 100 may include a plurality of user terminals 104 in communication with a network-accessible server 104. It is readily contemplated that network 100 may be any type of network over which computer data and instructions may be transmitted, including but not limited to, a local area network (LAN), a wide area network (WAN), a corporate intranet, a fiber optic network, a wireless network, the Internet, or any combination or interconnection of the same. The network 100 is also not necessarily restricted to the number of components, or their manner of interconnection, as shown in FIG. 1. The network 100 may include various effective and well-known security measures, such as encryption and secure transmission protocols, to securely communicate data.

The user terminals 102 may be any type of computing device that can communicate with server 104 over network 100, in order to accomplish the functions described herein. Accordingly, the user terminals 102 may be a personal computer (PC) including a desktop, palmtop, laptop or notebook computer, a workstation, a set-top box, a personal digital assistant (PDA), a wireless computing device with Internet access, or the like.

The server 104 may be any type of suitable computing device, including, for example, an enterprise network server of the type commonly manufactured by SUN MICROSYSTEMS OR IBM CORPORATION, and having a processor and memory for storing and executing processing instructions necessary to complete the functions described herein. The server 104 may also be a group of distributed servers rather than a single server as shown in FIG. 1.

Turning now to FIG. 2, there is depicted a flowchart of an exemplary process 200 for managing interactive network sessions, as may be performed, for example, between a user terminal 102 and server 104 of FIG. 1. The process 200 commences when a user logs into server 104 over network 100 via the user's terminal 102 (step 202). The user may log into server 104 in any of a variety of known manners. In an embodiment in which network 100 includes the Internet, step 202 may be accomplished by directing an Internet browser to the network address of server 104. The server 104 then initiates an interactive network session with the user (step 204).

During the interactive session, the user submits a request to provide information to the server (step 206). In one example, the user may be a customer, and server 104 may be operated by a credit card issuer or other financial institution. In such an embodiment, the user may, at step 206, request to open an account with the issuer, and submit the necessary personal and financial information. In such embodiments in which confidential or sensitive information is being submitted by a user, the transfer of information may be performed securely, for example, using a secure socket layer (SSL) or Secure-HTTP (S-HTTP) protocol.

Continuing with the process 200, server 104 initiates a timer of the interactive session and may transmit a form to the user that contains one or more fields for entering the information (step 208). The purpose of the timer, as in existing technologies, is to track the length of time a user session has been initiated, and set a threshold period of time after which the session is subject to being timed-out or terminated for inactivity. According to the presently disclosed processes alone however, server 104 may only terminate the user session after a period of inactivity if (a) the presence of the user can not be confirmed at user terminal 102, or (b) user terminal 102 is not secured from use by other users. The manner in which either of these conditions may be confirmed by server 104 is described in detail below.

In various embodiments, the timer may be initiated at the start of the interactive session, or initiated or reset at the time the form is transmitted to the user at step 208. In various embodiments, the timer may be reset upon receipt or entry of any portion of the information from the user, or other detection of user activity within the session.

In some embodiments, it is readily contemplated that the transfer of information between the user and server 104 may take place without the use of a form, such as by exchanging data, a file or the like. In such embodiments, the user session may be subject to being timed out if the data or file is not transferred before the threshold time period.

In various embodiments, the predetermined threshold time period may, for example, be in the range of ten to twenty minutes, inclusive. The length of time for this threshold may be set by an administrator of the server based on typical network resource demands and bandwidth availability, and may vary with the current network demand being experienced.

It should be readily appreciated that server 104 may initiate the timer by referencing an internal system clock or the like, as is well known in the art, and need not activate any separate timing device.

Returning to the process 200, server 104 may continuously or periodically monitor the user session to determine if all form data has been entered, or if the user has otherwise completed the user session (step 210). If so, the process 200 continues to step 218 below. Otherwise, the process 200 continues to step 212, where server 104 determines whether the threshold time limit has been reached. If the threshold time has not been reached, the process 200 may return to step 210 above in an iterative manner. If, on the other hand, the threshold time has been reached, and the information has not been completed by the user (or there is otherwise a period of inactivity in the user session), the process 200 continues.

Next, at step 214, when the user session is not completed and the threshold time period has been reached or is imminent, server 104 polls user terminal 102 to confirm whether the user is still present and whether user terminal 102 is secured from use by other users 214. In order to achieve this, server 104 may, at any time before or during the user session, transmit programming code for temporary or permanent installation on user terminal 102. The programming code may be any component, such as an ACTIVE-X, JAVA or JAVASCRIPT component, with processing instructions that enable server 104 to interact with the operating system of user terminal 102 and/or additional applications accessible thereto.

In various embodiments described below, when server 104 needs to make a decision about whether a timeout should occur, it may send a policy expression to user terminal 102. This may be a formula that describes the types of data should be used in the decision-making process, and what values should be used. One exemplary command may be a machine expression (i.e., programming code logic) of the following: "Timeout is No, IF any Interactive Session has been used in the last 10 minutes, or any keyboard keystrokes have occurred in the 5 minutes, or any mouse movements have been made in the last 5 minutes". The user terminal 102 would then evaluate that expression, and based on local activity, send a Timeout or No Timeout message back to server 104. The user terminal 102 may use values in the registry, information in the file system itself, or meta-data in the file system (e.g., date/time of files being updated) to evaluate the policy expression.

The programming code may determine whether the user is present at user terminal 102 in any of a variety of contemplated manners. In one embodiment, the programming code is operative to present a visual and/or audio alert to the user as the threshold time is reached or is imminent. The alert may take the form of a pop-up window that is presented on a display associated with user terminal 102. In some cases, the alert may require a response from the user, such as a mouse click or another user-initiated event. In additional cases, the response from the user must be received within a predetermined time that may or may not be based on the initial threshold period.

In an alternate embodiment in which server 104 may confirm the presence of a user, the programming code transmitted by server 104 may contain processing instructions that enable recognition that any of the following types of events have recently occurred on user terminal 102: (a) an update to an input device queue (e.g., a keyboard queue, a mouse queue or other user input device interface) of the operating system, (b) an opening or closing of another software application, (c) an insertion or removal of media in a media read/write device (e.g., a floppy disc drive, a compact disc (CD) drive, a digital video disc (DVD) drive, or the like) associated with user terminal 102, (d) an activation or deactivation of any component in communication with the computing device (e.g., a scanner, a printer or the like), and (e) an expansion or collapse of any window of the operating system.

These events may be recognized, for example, by polling or examining the registered entries in a WINDOWS Registry of user terminal 102 (when user terminal 102 operates a MICROSOFT WINDOWS operating system) to determine if an entries corresponding to these events have occurred within a recent period time (e.g., less than one minute). Since these events are all user-initiated, the entry of such events, as detected by the programming code, may serve to confirm the user's presence at user terminal 102. The programming code may, in turn, report a confirmation of any of these events to server 104.

In various operating system environments, event logs similar to the WINDOWS Registry may be examined in order to detect such events. It is readily contemplated that the programming code may also be able to interface with any of a variety of commonly used software applications to determine if they are currently in use on user terminal 102.

In a third embodiment in which server 104 may confirm the presence of a user, the programming code transmitted by server 104 may contain processing instructions that enable recognition of biometric devices (e.g., fingerprint, retinal scanners) or proximity sensing devices (e.g., an infrared or motion-sensing device or a device enabled to detect a badge or the like within a certain distance) that may be associated with user terminal 102. In such case, the programming code may poll these devices through an appropriate vendor-specific software interface to determine whether the devices have recently registered the presence of the user.

The other condition under which a user session will not be automatically timed out by server 104 is where it can be confirmed that user terminal 102 is presently secured from use by anyone other than the user that initiated the operating system. This condition may be confirmed concurrently with determining the user's presence, or may be confirmed only when the user's presence can not be.

The programming code may confirm this condition for example, when there is a local timeout on user terminal 102 and a password protection scheme has been activated thereon, in which a valid password must be entered in order to continue using user terminal 102. For example, most current WINDOWS-based computers have configurable security policies which control if and when a screen saver is executed, and whether a password is needed to unlock the screen or keyboard. In such case, the programming code could examine user terminal 102 to determine whether the screensaver and password protection have been activated. Other methods for determining whether user terminal 102 is secure may likewise be used.

When the user's presence is confirmed or user terminal 102 is secured from use by others (step 216) as described in the foregoing, server 104 may keep the user session active even after the threshold period expires (step 218), and may maintain the user session for as long as these conditions remain to be true or network conditions allow. If, on the other hand, neither of the conditions can be confirmed, server 104 may terminate the user session (step 220).

In any instance where a user session is terminated after the threshold period, it is readily contemplated that server 104 may store (permanently or for a set period of time) any data entered by the user prior to the timeout. If there is a subsequent interactive session with the user, the previously entered information can be retrieved and restored so that the user does not have to re-enter such data.

EXAMPLE IMPLEMENTATIONS

Figure 3:
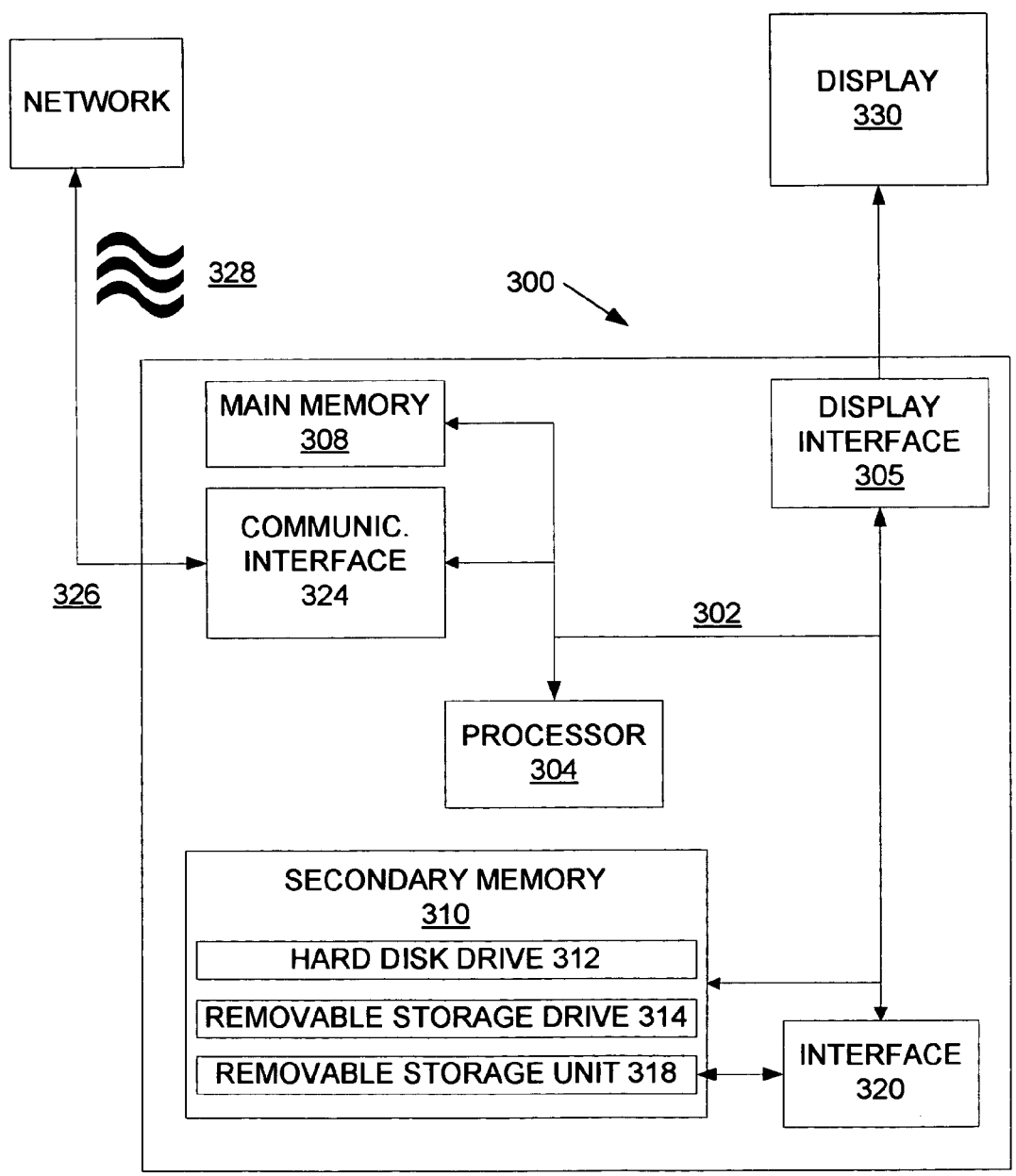
FIG. 3 is a block diagram of an exemplary computer system useful for implementing the present disclosure.

The processes disclosed herein (i.e., process 200, and/or any part(s) or function(s) thereof) may be implemented using hardware, software or a combination thereof and may be implemented in one or more computer systems or other processing systems. In fact, in one embodiment, the hardware may include one or more computer systems capable of carrying out the functionality described herein. An example of a computer system 300 is shown in FIG. 3. The computer system 300 includes one or more processors, such as processor 304. The processor 304 is connected to a communication infrastructure 302 (e.g., a communications bus, cross-over bar, or network). Various software embodiments are described in terms of this exemplary computer system. After reading this description, it will become apparent to a person skilled in the relevant art(s) how to implement the processes disclosed herein using other computer systems and/or computer architectures.

Computer system 300 can include a display interface 305 that forwards graphics, text, and other data from the communication infrastructure 302 (or from a frame buffer not shown) for display on the display unit 330.

Computer system 300 also includes a main memory 308, preferably random access memory (RAM), and may also include a secondary memory 310. The secondary memory 310 may include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well known manner. Removable storage unit 318, represents a floppy disk, magnetic tape, optical disk, etc. which is read by and written to by removable storage drive 314. As will be appreciated, the removable storage unit 318 includes a computer usable storage medium having stored therein computer software and/or data.

In alternative embodiments, secondary memory 310 may include other similar means for allowing computer programs or other instructions to be loaded into computer system 300. Such means may include, for example, a removable storage unit 318 and an interface 320. Examples of such may include a program cartridge and cartridge interface (such as that found in video game devices), a removable memory chip (such as an electronically programmable read-only memory (EPROM), or programmable read-only memory (PROM)) and associated socket, and other removable storage units 318 and interfaces 320 which allow software and data to be transferred from the removable storage unit 318 to computer system 300.

Computer system 300 may also include a communications interface 324. Communications interface 324 allows software and data to be transferred between computer system 300 and external devices. Examples of communications interface 324 may include a modem, a network interface (such as an Ethernet card), a communications port, a Personal Computer Memory Card International Association (PCMCIA) slot and card, etc. Software and data transferred via communications interface 324 are in the form of signals 328 which may be electronic, electromagnetic, optical or other signals capable of being received by communications interface 324. These signals 328 are provided to communications interface 324 via a communications path (i.e., channel) 326. This channel 326 carries signals 328 and may be implemented using wire or cable, fiber optics, a phone line, a cellular phone link, a radio frequency (RF) link and other communications channels.

In this document, the terms "computer program medium" and "computer usable medium" are used to generally refer to media such as removable storage drive 314, a hard disk installed in hard disk drive 312, and signals 328. These computer program products are means for providing software to computer system 300. The disclosure is directed to such computer program products.

Computer programs (also called computer control logic) are stored in main memory 308 and/or secondary memory 310. Computer programs may also be received via communications interface 324. Such computer programs, when executed, enable the computer system 300 to perform the features of the present disclosure as discussed herein. In particular, the computer programs, when executed, enable the processor 304 to perform the features of the present disclosure. Accordingly, such computer programs represent controllers of the computer system 300.

In an embodiment where the process is implemented using software, the software may be stored in a computer program product and loaded into computer system 300 using removable storage drive 314, hard drive 312 or communications interface 324. The control logic (software), when executed by the processor 304, causes the processor 304 to perform the functions of the invention as described herein.

In another embodiment, the process is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the process is implemented using a combination of both hardware and software.

CONCLUSION

Although the best methodologies of the disclosure have been particularly described above, it is to be understood that such descriptions have been provided for purposes of illustration only, and that other variations both in form and in detail can be made thereupon by those skilled in the art without departing from the spirit and scope thereof, which is defined first and foremost by the appended claims.

What is claimed is:
1. A method comprising:
    initiating, by a server system for managing an interactive session having a processor and a non-transitory memory, the interactive session over a computer network with a computing device;
    initiating, by the server system, a timer of the interactive session, in response to a request to transmit information;
    polling, by the server system, the computing device outside of the interactive session in response to the timer reaching a predetermined threshold without the information being transmitted, wherein the polling further comprises transmitting, by the server system, to the computing device, programming code for installation on the computing device, the programming code for enabling the server to interact with the operating system of the computing device to determine that the user is present at the computing device and that the computing device is secured from use by other users; and
    installing, by the server system, the programming code on the computing device;
    determining, by the server system, that a user is present at the computing device based on the polling of the computing device outside of the interactive session, absent receiving a response to a request for user input to confirm the presence of the user and absent the coupling of a physical peripheral device configured to solely confirm the presence of the user to the computing device;
    determining, by the server system, that the computing device is secured from use by other users by receiving, by the server system, a determination by the computing device, that a password protection scheme has been activated by the operating system, the password protection scheme requiring an entry of a valid password to continue using the computing device;

maintaining, by the server system, the interactive session in response to the determining at least one of that the user is present and that the computing device is secured from use by other users; and terminating, by the server system, the interactive session in response to a determination that the user is not present at the computing device or the computing device is not secured from use by other users.

2. The method of claim 1, wherein the request to transmit information comprises a request to transmit confidential information.

3. The method of claim 1, wherein the request to transmit information comprises a request to open a financial account.

4. The method of claim 1, wherein the predetermined threshold comprises a time period between ten minutes and twenty minutes, inclusive.

5. The method of claim 1, wherein the timer is initiated at the start of the interactive session.

6. The method of claim 1, further comprising resetting, by the server system, the timer upon receipt of any portion of the information from the user.

7. The method of claim 1, wherein the programming code comprises at least one of: ACTIVE-X code, JAVA code and JAVASCRIPT code.

8. The method of claim 1, wherein the determining whether the user is present at the computing device further comprises receiving, by the server system, a confirmation, by the computing device, that the user is present at the computing device in response to at least one of the following events occurring at the computing device:

an update to an input device queue of the operating system,
an opening of an application registered in a registry of the operating system,
a closing of an application registered in the registry,
an insertion of media in the computing device,
a removal of media from the computing device,
an activation of any component in communication with the computing device,
deactivation of any component in communication with the computing device,
an expansion of any window of the operating system, and
a collapse of any window of the operating system.

9. The method of claim 1, further comprising:
resetting the timer when the valid password is entered.

10. The method of claim 1, wherein any information received from the user prior to terminating the interactive session is stored by the computing device, and wherein the stored information is retrieved during a subsequent interactive session with the user, whereby the user does not have to re-enter any of the stored information.

11. The method of claim 1, further comprising resetting the timer of the interactive session, by the server system, in response to a determination that the user is present at the computing device and the computing device is secured from use by other users.

12. A computer based server system for managing an interactive network session, comprising:
a processor for managing an interactive session;
a network communication interface; and
a non-transitory memory in communication with the processor, the memory being configured to store a plurality of processing instructions directing the processor, in conjunction with the network communication interface, to:

initiate, by the processor, an interactive session over a computer network with a computing device;
initiate, by the processor, a timer of the interactive session, in response to a request to transmit information;
poll, by the processor, the computing device outside of the interactive session in response to the timer reaching a predetermined threshold without the information being transmitted, wherein the polling further comprises transmitting, by the processor, to the computing device, programming code for installation on the computing device, the programming code for enabling the server to interact with the operating system of the computing device to determine that the user is present at the computing device and that the computing device is secured from use by other users; and
install, by the processor, the programming code on the computing device;
determine, by the processor, that a user is present at the computing device based on the polling of the computing device outside of the interactive session, without receiving a response to a request for user input to confirm the presence of the user and absent the coupling of a physical peripheral device solely configured to confirm the presence of the user to the computing device;
determine, by the processor, that the computing device is secured from use by other users by receiving, by the processor, a determination by the computing device, that a password protection scheme has been activated by the operating system, the password protection scheme requiring an entry of a valid password to continue using the computing device; and
maintain, by the processor, the interactive session in response to the determination that the user is present and that the computing device is secured from use by other users;
terminate, by the processor, the interactive session in response to a determination at least one of that the user is not present at the computing device or the computing device is not secured from use by other users.

13. A non-transitory computer-readable storage medium having stored thereon sequences of instruction, the sequences of instruction including instruction which when executed by a server system for managing an interactive session causes the server system to perform operations comprising:

initiating, by the server system, an interactive session over a computer network with a computing device;
initiating, by the server system, a timer for timing the interactive session, in response to a request to transmit information;
polling, by the server system, the computing device outside of the interactive session in response to the timer reaching a predetermined threshold without the information being transmitted, wherein the polling further comprises transmitting, by the server system, to the computing device, programming code for installation on the computing device, the programming code for enabling the server to interact with the operating system of the computing device to determine that the user is present at the computing device and that the computing device is secured from use by other users;
installing, by the server system, the programming code on the computing device;
determining, by the server system, that a user is present at the computing device based on the polling of the computing device outside of the interactive session, without receiving a response to a request for user input to confirm the presence of the user and absent the coupling of a physical peripheral device solely configured to confirm the presence of the user to the computing device;

determining, by the server system, that the computing device is secured from use by other users receiving, by the server system, a determination by the computing device, that a password protection scheme has been activated by the operating system, the password protection scheme requiring an entry of a valid password to continue using the computing device;

maintaining, by the server system, the interactive session in response to the determination that the user is present and that the computing device is secured from use by other users; and terminating, by the server system, the interactive session after the predetermined threshold is reached, in response to a determination at least one of that the user is not present at the computing device or the computing device is not confirmed to be secured against use by other users.

* * * * *